Feb. 23, 1932.  A. E. W. JOHNSON  1,846,489
TRACTOR DISK HARROW
Filed May 31, 1930   2 Sheets-Sheet 1
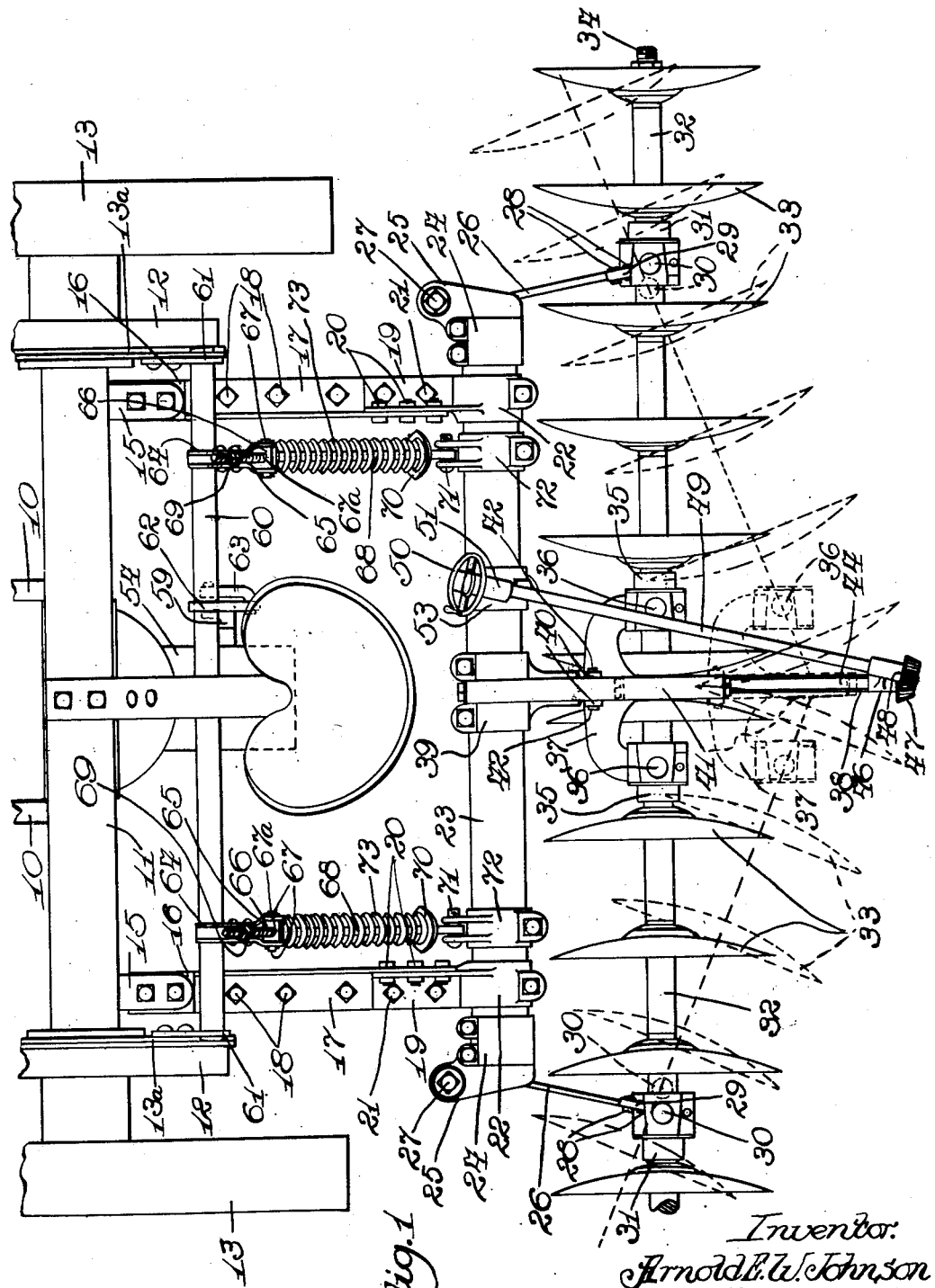

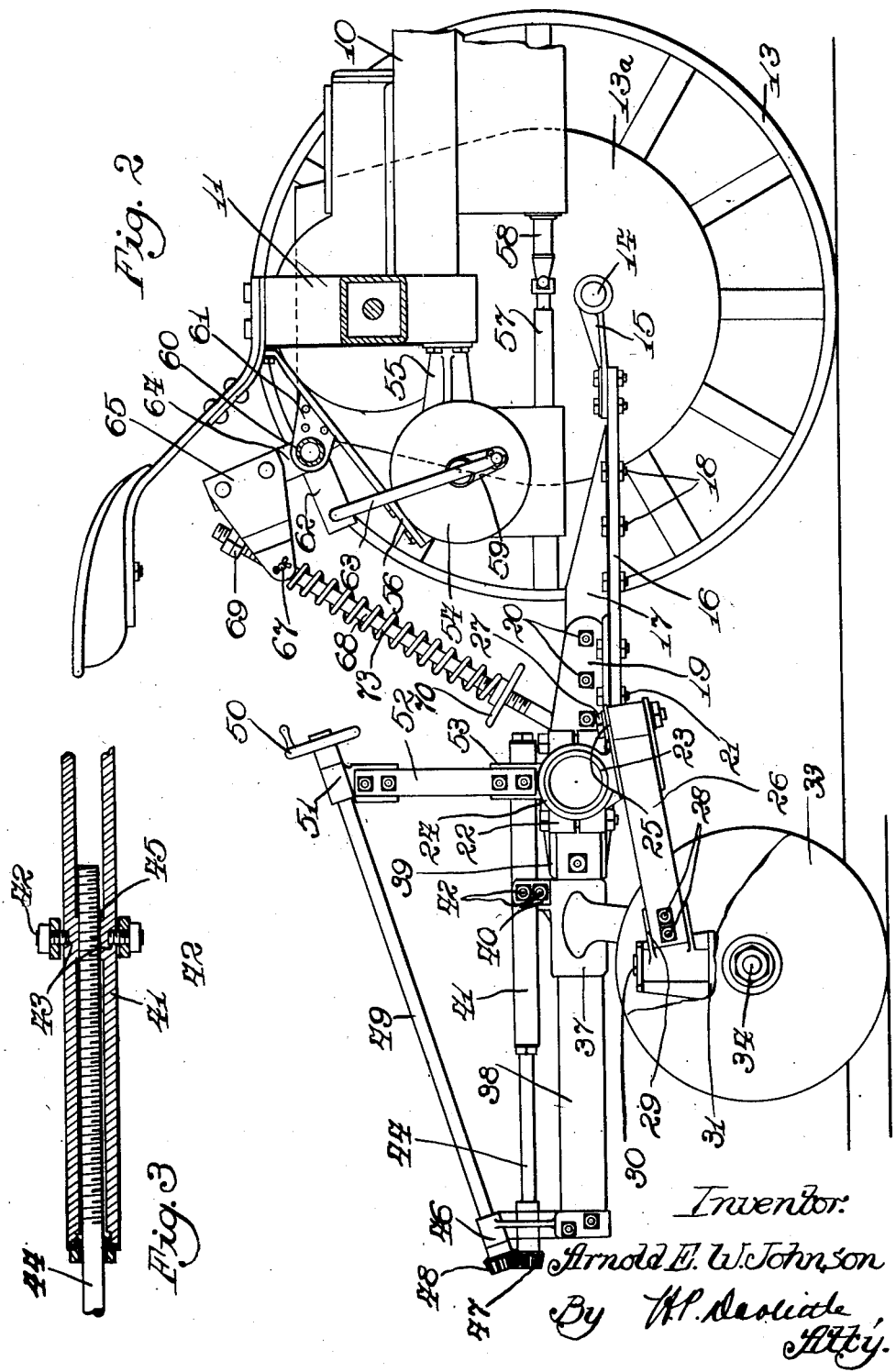

Patented Feb. 23, 1932

1,846,489

UNITED STATES PATENT OFFICE

ARNOLD E. W. JOHNSON, OF CHICAGO, ILLINOIS, ASSIGNOR TO INTERNATIONAL HARVESTER COMPANY, A CORPORATION OF NEW JERSEY

TRACTOR DISK HARROW

Application filed May 31, 1930. Serial No. 457,870.

This invention relates to a disk harrow. More specifically it relates to direct connected disk harrows for tractors.

The principal object of the invention is to provide an improved pivoted gang harrow structure adapted to be directly connected to a tractor.

Another object is to provide means operable from the operator's station on the tractor for positively adjusting the angle of the gangs of the harrow.

Another object is to provide a power lift actuated by the power take-off of the tractor for lifting the harrow out of operative position and for applying pressure to the gangs when lowered.

Other objects will be apparent from the detailed description to follow.

In the drawings:

Figure 1 is a plan view of the rear end of a tractor with the harrow of the invention attached in operative position (the harrow is shown in the maximum angled position in dotted lines);

Figure 2 is an elevation of the same device shown in Figure 1; and,

Figure 3 is an enlarged detail, showing a portion of the angle adjusting means.

The tractor shown is of a well known general purpose type having side frame members 10, extending forwardly from an arched rear axle structure comprising a rear axle housing 11, downwardly extending gear housing 12, and driving wheels 13, which are mounted on the stub-axles extending from the housings 12. Plates 13a form the inside portions of the housings 11. Short stub-shafts or pintles 14 are mounted on the plates 13 below the axis of the traction wheels to provide pivot supports for bearing brackets 15, which are secured to the arms of a U-shaped frame member or drawbar 16 extending rearwardly from the tractor. Short angle bars 17 are secured to the sides of the drawbar by bolts 18 to strengthen said bar and to assist in the support of brackets 19 which are rigidly secured at the rearward ends of the bars 17. The brackets 19 have an angular, forward portion secured by bolts 20 to the vertical portions of the angles 17 and by bolts 21 to the horizontal portion and to the frame or drawbar 16. The rearward portions of the bracket 19 are in the form of a split sleeve or clamp having a removable cap 22. A cross member, preferably a tubular shaft 23, extends through the brackets 19 and is rigidly clamped therein by the caps 22 in parallel relation to the transverse portion of the U-shaped frame member 16.

Brackets 24 are rigidly attached to the ends of the shaft 23 and are provided with spaced, laterally extending portions 25, which form means for pivotally attaching thereto draft links in the form of bars 26 on a substantially vertical axis. Bolts 27 extend through the extensions 25 and through bores formed at the end of the bar 26. The bars 26, at their other ends, are rigidly secured by bolts 28 to bearing brackets 29 which are provided with vertical bores for pivotally mounting them on shafts 30. The shafts 30 extend upwardly from a bearing 31 of a conventional nature surrounding one of the spacing spools 32 in a disk gang. The disk gang is of a conventional construction having a plurality of disks 33 spaced by spools 32 and held together by a tie-rod 34. In the particular construction shown, five disks are provided and the bearing 31 is positioned intermediate the third and fourth disk. The disk gangs are positioned with their inner ends in closely spaced relation. Intermediate the first and second disk, bearings 35 having upstanding shafts 36 provide means for supporting the inner ends of the gangs.

A supporting head or block 37, substantially U-shaped in a horizontal plane, is provided with bores at its ends through which the shafts 36 extend. As shown in Figure 3, the central portion of the member 37 is slidably mounted on a longitudinally extending bar 38. The bar 38 is rigidly secured to a supporting bracket 39, which is mounted at the center of shaft 23. Short, upstanding bars 40 are secured to the upper portion of the member 37 to provide means for pivotally attaching a hollow shaft 41. Cap-screws 42 extend through the bars 40 into threaded sockets 43 in the shaft 40 (Figure 3).

Figure 3 shows an enlarged view of means by which the shaft 41 may be pivotally mounted and provided with means for adjusting it longitudinally with respect to a shaft 44 threaded therethrough. Near the pivot point, a threaded portion 45 is provided which engages the threaded portion of the shaft 44. The remainder of the shaft 41 is of a larger bore than the shaft 44, to provide protection for the threaded portion of shaft 44. The shaft 44 is journaled at its rear end in a bracket 46 rigidly secured to the rearward end of the bar 38 and extending upwardly therefrom. At the outer or rear end of the shaft 44, a gear 47 is mounted, which is adapted to engage and be driven by a gear 48 mounted on a shaft 49, which is journaled in an inclined bearing on the bracket 46. The shaft 49 extends upwardly forward to one side of the tractor operator's station and is provided with a hand wheel 50 for rotation to adjust the longitudinal relation of the shafts 44 and 41. The forward end of the shaft 49 is journaled in a supporting bracket 51, which is rigidly secured to a supporting standard 52. The supporting standard is secured to a bracket 53, which is mounted on the shaft 23.

A power lift 54, shown in outline, is attached to the axle housing 11 of the tractor by a bracket 55 and a bracing member 56. The power lift is adapted to be driven by a shaft 57, which is connected by a universal joint with the tractor power take-off shaft 58. The power lift is provided with a crank 59. The drive for the lift mechanism is constructed to rotate the crank 59 approximately 180 degrees for each cycle of rotation. In the drawings, the crank is shown in downward position. Its other position would be diametrically opposite.

A rockshaft 60 is mounted transversely of the tractor in supporting brackets 61. A crank lever 62 rigidly secured to the rockshaft 60 is pivotally connected by a link 63 with the power lift crank 59. At each side, the rockshaft 60 is provided with a rigidly attached, upwardly extending arm 64, on opposite sides of which plates 65 are riveted thereto. The plates 65 are flared out to provide a space in which a block 66 is mounted. The block 66 has laterally extending stubshafts 67 which pivotally mount it in the plates 65.

The blocks 66 are provided with centrally positioned openings 67a through which lifting rods 68 slidably extend. The rods 68 are threaded at their upper ends and provided with a pair of nuts 69 which form adjustable stops engaging the upper sides of blocks 66 during the lifting operation. Below the blocks 66 and near the lower ends of the lifting rods, collars 70 are threaded on the rods 68 and compression springs 73 mounted on the rods abut the collar 70 and the block 66. The lower ends of the rods 68 are pivotally connected by pins 71 to brackets 72 mounted on the shaft 23.

It will be understood from the detailed description that the disk gangs are pivotally mounted near their outer ends on the bars 26, which are in turn pivotally mounted at the ends of the shaft 23. At their inner ends the gangs are pivotally mounted on vertical axes on the member 37, which is in turn slidably mounted on the bar 38. The particular construction disclosed assumes that there can be no angular movement of the disk gang with respect to the shaft 23 about a transverse axis. As the shaft 23 is rigidly mounted in the brackets 19, any movement about a transverse axis takes place about the pivots 14 at the forward end of the arms of frame 16. A rigid supporting structure having a low point of draft connection with the tractor is thus provided.

The shafts 49 and 44, together with the associated elements which provide means for sliding the member 37 longitudinally with respect to the bar 38, provide means for positively adjusting the angle of the disk gangs. As shown in the dotted position in Figure 1, the inner ends of the two disk gangs are so positioned when in their aligned position that the forward edges of the disks will approximately contact when the gangs are in their maximum angled position. The floating link attachment 26 for the outer end of the gang provides a means for allowing the disk gang to move axially thereby permitting the use of the rigid member 37 at the center, which is capable of movement only in a longitudinal direction.

In Figure 3, the harrow is shown in operative position with the lower edge of the disk 33 below the lower edge of the tractor wheel 13. When it is desired to lift the harrow out of operative position, the power lift 54 is actuated, the lever arm 62 being rotated upwardly with the blocks 66 engaging the nuts 69 on the rods 68. The frame or drawbar 16 and the elements carried thereby, including the shaft 23, is tilted upwardly about the pivots 14 as an axis. As the bars 26 and the bar 38, which form a support for the disk gangs, are non-rotatably mounted with respect to the shaft 23 and as the shaft 23 is non-rotatably mounted on the drawbar, the entire structure is rotated about the pivots 14 as an axis and is thereby lifted out of operative position by the power lift.

The springs 73 provide means for resiliently forcing the disk gangs into contact with the soil. The amount of pressure applied is determined by the compression of the springs, which is adjusted by rotating the collars 70 while the height of lift may be adjusted by changing the position of nuts 69.

Although applicant has shown and described a preferred embodiment of his invention, it is to be understood that he claims

What is claimed is:

1. A disk harrow comprising a frame structure, a pair of disk gangs positioned rearwardly from said structure, links pivotally connected to the ends of the frame structure and to the outer ends of the disk gangs, a centrally positioned extension rigid with respect to the frame structure and extending rearwardly therefrom, a gang supporting means slidable on said extension and connected to the inner ends of said gangs, said gangs being pivoted on substantially vertical axes to said supporting means, and means for adjusting the position of the supporting means along said rigid extension.

2. A disk harrow comprising a frame structure, a pair of disk gangs positioned rearwardly from said structure, links pivotally connected to the ends of the frame structure and to the outer ends of the disk gangs, a centrally positioned extension rigid with respect to the frame structure and extending rearwardly therefrom, a gang supporting means slidable on said extension and connected to the inner ends of said gangs, said gangs being pivoted on substantially vertical axes to said supporting means, and means for adjusting the position of the supporting means along said extension comprising a threaded block carried by the gang supporting means, a threaded screw rotatably journaled on the extension and means for rotating the screw.

3. A disk harrow comprising a frame structure, a pair of disk gangs positioned rearwardly from said structure, links pivotally connected to the ends of the frame structure and to the outer ends of the disk gangs, a centrally positioned extension rigid with respect to the frame structure and extending rearwardly therefrom, a gang supporting means slidable on said extension and connected to the ends of said gangs, said gangs being pivoted on substantially vertical axes to said supporting means, and means for adjusting the position of the supporting means along said extension comprising a threaded member carried thereby, a bearing bracket on the outer end of the supporting bar, a shaft journaled in said member and threaded in said bracket, an actuating shaft journaled in said bracket, and cooperatively engaging gears on said shafts, the actuating shaft extending upwardly forward and being provided with means for rotation thereof.

4. A disk harrow adapted to be directly connected to a tractor comprising a frame structure adapted to be hinged to the tractor on a transverse axis, means for connection to a tractor for adjusting the angular position of said structure about its axis, a pair of disk gangs positioned rearwardly of the frame structure, links pivotally connected to the frame structure and to the outer ends of the disk gangs on substantially vertical axes, a centrally located extension rigid with respect to the frame structure and extending rearwardly therefrom, and a gang supporting means slidable on said extension, said disk gangs being pivoted at their inner ends to the supporting means on substantially vertical axes.

5. A disk harrow comprising a traction element, a drawbar pivoted thereto on a transverse axis, a transverse shaft rigidly secured to said drawbar, a pair of disk harrow gangs positioned rearwardly of the drawbar the inner ends thereof being positioned adjacent each other and centrally behind the transverse shaft, a supporting bar rigidly attached to the shaft and extending centrally and rearwardly therefrom, a supporting block mounted on said bar and slidable with respect thereto, said block having lateral extensions to which the inner ends of the disk gangs are pivotally attached on vertical axes, bars pivotally joined to the outer ends of the gangs and to the ends of the transverse shaft on vertical axes, and means for adjusting the supporting block longitudinally of the supporting bar thereby altering the relative angular positions of the gangs.

6. A device as set forth in claim 4, in which means are provided for lifting the harrow out of operative position comprising a rockshaft mounted on the rear of the traction element, a lever arm rigidly secured to said shaft, a power lift mechanism adapted to oscillate said lever arm, and lifting means nonrotatably secured to the rockshaft and to the harrow frame structure.

7. The combination with a tractor having an arched rear axle structure and traction wheels, of a rearwardly extending frame structure having laterally spaced portions connected to the axle structure on transverse pivots located below the axis of the wheels, disk gangs mounted on the frame structure for angular movements horizontally, means on the tractor for lifting and lowering the frame structure on its pivot connections to the axle structure, and means operable from the operator's station on the tractor for adjusting the angle of the disk gangs.

8. The combination with a tractor having an arched rear axle construction and traction wheels, of a rearwardly extending frame structure having laterally spaced portions connected to the axle structure on transverse pivots located below the axis of the wheels, a rock shaft mounted at the rear of the tractor, lifting connections between said shaft and the frame structure, power lift mechanism operatively attached to said shaft and adapted to be actuated from the tractor, disk gangs mounted on said frame structure, and means operable from the operator's station on the tractor for adjusting the angle of the disk gangs.

9. The combination with a tractor, of a rearwardly extending frame structure having laterally spaced portions connected to the tractor on a transverse pivot axis, a disk implement mounted on the frame structure, means operable to alter the horizontal angular position of said implement, a rock shaft rotatably mounted on the tractor above said frame, and means actuated by the tractor motor and connected to said shaft and to the frame structure operable to adjust the said structure about its pivot axis whereby the vertical position of the implement may be altered.

In testimony whereof I affix my signature.

ARNOLD E. W. JOHNSON.